(12) United States Patent
Peddie

(10) Patent No.: US 10,975,833 B2
(45) Date of Patent: Apr. 13, 2021

(54) MODULAR HYDRO-KINETIC POWER SOURCE

(71) Applicant: Timm Peddie, Atlanta, GA (US)

(72) Inventor: Timm Peddie, Atlanta, GA (US)

( * ) Notice: Subject to any disclaimer, the term of this patent is extended or adjusted under 35 U.S.C. 154(b) by 0 days.

(21) Appl. No.: 16/269,254

(22) Filed: Feb. 6, 2019

(65) Prior Publication Data

US 2019/0257282 A1  Aug. 22, 2019

Related U.S. Application Data

(60) Provisional application No. 62/627,550, filed on Feb. 7, 2018.

(51) Int. Cl.
| | | |
|---|---|---|
| *F03B 13/12* | (2006.01) | |
| *H02K 7/18* | (2006.01) | |
| *F03B 13/26* | (2006.01) | |
| *F03B 17/06* | (2006.01) | |

(52) U.S. Cl.
CPC ............ *F03B 13/12* (2013.01); *F03B 13/264* (2013.01); *F03B 17/06* (2013.01); *H02K 7/1853* (2013.01); *F05B 2220/709* (2013.01); *F05B 2240/40* (2013.01); *F05B 2240/97* (2013.01); *F05B 2250/02* (2013.01); *F05B 2250/40* (2013.01)

(58) Field of Classification Search
CPC ........ F03B 13/12; F03B 13/264; F03B 17/06; H02K 7/1853; F05B 2220/709; F05B 2240/40; F05B 2240/97; F05B 2250/02; F05B 2250/40
See application file for complete search history.

(56) References Cited

U.S. PATENT DOCUMENTS

| | | | | |
|---|---|---|---|---|
| 6,323,563 B1* | 11/2001 | Kallenberg, Jr. | ..... | F03B 17/067 290/42 |
| 6,731,019 B2 | 5/2004 | Burns et al. | | |
| 6,768,216 B1* | 7/2004 | Carroll | .................. | F03B 13/148 290/42 |
| 7,315,092 B2* | 1/2008 | Cook | ...................... | F03B 13/20 290/42 |
| 8,304,925 B2* | 11/2012 | Yang | ....................... | F03B 13/20 290/42 |

(Continued)

OTHER PUBLICATIONS

Wikipedia, "Tidal Power," downloaded from https://en.wikipedia.org/w/index.php?title=Tidal_power&oldid=821799723, Jan. 22, 2018 at 18:23 (10 pages).

(Continued)

*Primary Examiner* — Tulsidas C Patel
*Assistant Examiner* — Joseph Ortega
(74) *Attorney, Agent, or Firm* — Silicon Edge Law Group LLP; Arthur J. Behiel

(57) ABSTRACT

A modular system of generating electrical power from mechanical energy of kinetic motion originating in current, waves, and tides, where the system resembles natural habitat and illustrates options for optimizing the transmission of current through the system. One or more branches elongate members containing current generators extend up from the bottom of a body of water. The elongate members move with water, in the manner of kelp, to actuate the current generators, and thus transform mechanical energy due to forces inherent in a body of water to electrical power.

13 Claims, 4 Drawing Sheets

(56) References Cited

U.S. PATENT DOCUMENTS

| | | | | |
|---|---|---|---|---|
| 8,314,506 B2* | 11/2012 | Rhinefrank | ............. | F03B 13/20 290/53 |
| 8,579,576 B2* | 11/2013 | Fraenkel | ............. | F03B 17/061 415/4.3 |
| 8,806,865 B2* | 8/2014 | Dunn | ............. | F03B 13/20 60/501 |
| 8,853,872 B2* | 10/2014 | Clidaras | ............. | F03B 13/20 290/43 |
| 9,528,900 B2 | 12/2016 | Gregory | | |
| 9,732,724 B1* | 8/2017 | Burke | ............. | F03B 17/06 |
| 9,856,854 B2 | 1/2018 | Yañez Villarreal | | |
| 10,495,053 B2* | 12/2019 | Alm | ............. | F04B 53/144 |
| 2005/0099010 A1* | 5/2005 | Hirsch | ............. | F03B 13/1845 290/42 |
| 2006/0244267 A1* | 11/2006 | Fraenkel | ............. | F03B 13/264 290/54 |
| 2008/0209234 A1* | 8/2008 | Clidaras | ............. | F03B 13/1885 713/300 |
| 2010/0129193 A1* | 5/2010 | Sherrer | ............. | F03B 3/18 415/1 |
| 2010/0140944 A1* | 6/2010 | Gardiner | ............. | F03B 13/16 290/53 |
| 2010/0183377 A1* | 7/2010 | Fraenkel | ............. | E02D 27/52 405/232 |
| 2011/0057448 A1* | 3/2011 | Page | ............. | F03B 13/20 290/53 |
| 2013/0099496 A1* | 4/2013 | Solheim | ............. | B63B 21/50 290/44 |
| 2014/0219799 A1* | 8/2014 | Selsam | ............. | F03D 1/065 416/11 |
| 2016/0045841 A1* | 2/2016 | Kaplan | ............. | B01J 19/0093 429/49 |
| 2016/0061180 A1* | 3/2016 | Eavis | ............. | F03B 13/22 290/53 |
| 2018/0050764 A1* | 2/2018 | Moffat | ............. | F03D 9/25 |
| 2019/0360452 A1* | 11/2019 | Qu | ............. | F03B 13/1875 |

OTHER PUBLICATIONS

Office of Energy Efficiency & Renewable Energy, "Marine and Hydrokinetic Technology Glossary | Department of Energy," downloaded from https://energy.gov/eere/water/marine-and-hydrokinetic-technology-glossary on Jan. 23, 2018 (8 pages).

* cited by examiner

MODULAR HYDRO-KINETIC POWER SOURCE

FIELD OF THE INVENTION

The invention relates to underwater hydroelectric farms and the electrical generation and transfer from natural forms of kinetic energy within these bodies of water to electrical energy.

BACKGROUND

Hydroelectric power currently comprises only just a small fraction of power around the world. In the United states, it ranks number five, with 5% of total energy originating from hydroelectric power. Today, most hydroelectric power originates from dams, and the finite number of rivers with suitable flow and proximity limits the wide scale use of such power. Moreover, dams can negatively impact habitats of aquatic life and neighboring geology and can inhibit the natural use of the body of water within set proximity to any hydroelectric facility, further disrupting the natural habitat and local animals. For example, hydropower and related sources of power stemming from rivers include hydraulic dams that greatly modify natural water flows, which also negatively disrupt the natural habitat. This may include the land in proximity to the dam used to build the hydro facility as well as the land devastated to create the source body of water or reservoir above the dam.

SUMMARY

A hydro-kinetic power source converts kinetic energy from ocean tides and currents into electrical power. The power source includes flexible elongate members with integrated generators. The elongate members extend upward from an anchor point on the bottom of a body of water toward the surface. The elongate members move about like kelp actuate integrated generators to capture kinetic energy from tidal flow, wave, currents, and surge. Power thus captured is conveyed to a modular relay platform.

A plurality of elongate members may be attached to the relay platform with an easy plug connection. Each branch may extend from the floor of the body of water to the surface and affords a surface area that manages the dissipation of heat from the system to the surrounding water.

A set of elongate members are anchored to the bottom of the body of water (e.g., to the seafloor) via an anchor system. The elongate members can be buoyant or can be provided with floats so that they extend from upward from an anchor point or points. A trunk system, relay platform, and transmission module gather and convey electrical power from the elongate members from the body of water, such as to an energy grid or storage facility.

Each elongate member may vary in size (length and width). While initially seen as tubular, it could also maximize surface area, similar to a blade of grass, by being thinner than wide, and longer in length. Size also correlates to the weight of each current generator. In one embodiment the elongate members include micro-sized current generators, approximately 2.5 cm wide×5 cm high (and tubular), with the encapsulating elongate member extending from proximity to the floor of the body of water to just below the surface (and may vary on distance from the surface, to provide for surface use of the body of water, whether swimmer, ski boat, or commercial vessel) to allow for natural movement and sway, simulating similar forms of aquatic fauna.

In one embodiment, an oscillating weight physically connects to a system of gears connected to a coil. The weight may reside upon a plane structure, which when moved, converts to power. The weight may move in any lateral direction, which pressures the plane structure, and is it compresses, the opposite side elongates, driving a single-directional gear forward. In another embodiment, the weight slides across a magnetic, effectively frictionless, cylinder, which also connects into a system of gears connected to a coil. Neodymium and samarium-cobalt magnets are desirable in such application due to their strong magnetic fields. In another embodiment, the weight consists of a ball that rolls across the plane structure, which compresses a spring that connects to a system of gears, which ratchet continuously.

In each embodiment, the weight holds a natural state, where the aquatic forces result in the disruption of this state, moving the weight, with resulting kinetic energy captured and transferred through the system. Hydro-kinetic power sources of the type disclosed herein may be in proximity to the shore or further away from shore. Surface buoys or floatation devices are optional.

In one embodiment the flexible elongate members include hinge assemblies that combine transducers for converting flexion and rotation to mechanical power, which can then be converted to electrical power. Suitable hinge assemblies are detailed in U.S. Pat. No. 8,806,865 to Dunn et al., which is incorporated herein by reference.

In another embodiment the flexible elongate members dispense with or complement hinges using flexible, cylindrical bodies that support energy-harvesting yarns of e.g. carbon nanotubes (CNTs) that stretch or twist with movement of the elongate members. The energy-harvesting yarns of CNT are coated or immersed within an ionically conducting material, an electrolyte. A voltage develops across the yarn when stretched or twisted in the electrolyte.

Hydro-kinetic power sources of the type disclosed herein enhance aquatic habitat and protect aquatic life, particularly when groups of three or more flexible elongate members are collocated within e.g. 24 inches. Such collections create artificial kelp beds that offer shelter to species of aquatic life.

A trunk system holds each elongate member at or within proximity to the floor of the body of water. An optimum depth for the trunk system may be within 10 meters of the water surface, or as identified per location, to optimize the cost of the system and forces originating from the body of water, ease of maintenance, and the cost and efficiency of power transfer. The relay platform may include one or more cables encased in an environmentally protective layer or coating and may be submerged or above ground.

One or more relay platforms conducts electrical energy pulled from each current generator to optimize the transmission of power through the system. Multiple generator bodies optimize the transmission of energy by mapping into a separate system of circuits and switches. The relay platform connects via wired or wireless connections into the power transmission module, which then connects into either a power grid or energy storage facility.

Power transmission modules may include one or more power lines. Power lines may be short-distance or long-distance lines, connecting to a public or private energy backbone or grid for widespread access to the power generated. Similarly, power may be collected in an energy storage facility, such as a system of accumulators or batteries, whether by coil, layer, or other. All materials with contact to water and the outside environment get encased in polymers and metals formed of non-corroding materials, with a protective coating.

The complete system may be installed at each location, in modular assembly, also allowing for repair and modification to existing deployments by replacing deployed, submerged elongate members or by releasing the trunk system and pulling all or part of the system to land.

Using hydro-kinetic power sources of the type detailed herein, not only may people further leverage rivers, but coasts (lakes, seas, oceans) and any body of water with current, tides, or waves that drive sub-surface movement of water. Submerged beds of flexible elongate members foster marine life without interfering with recreational boats, swimmers, surfers, etc., even within direct contact to the moving members. The members need not include exposed turbines, hubs, spokes, blades, rotators, fans, propellers, or similar means. This dramatically improves the number of locations and benefit societies have for generating hydro-electric power.

Arrays of hydro-kinetic elongate members can be interconnected to optimize the power delivery. Members can be connected electrically in series or in parallel to provide desired levels of voltage and current for safe, efficient power transmission. In some embodiments a power transmission module can dynamically alter the combination of series and parallel interconnectivity.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

Figure 1:
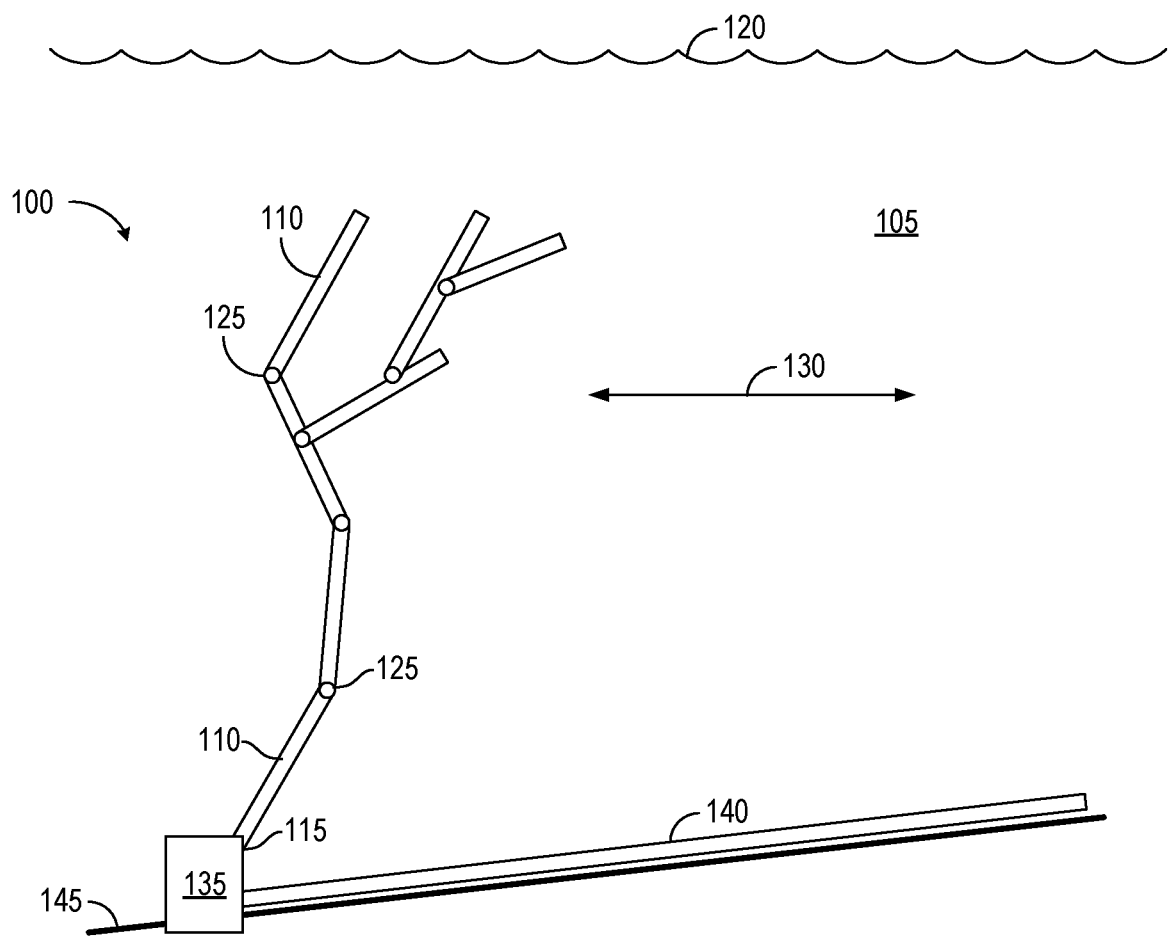
FIG. 1 depicts hydro-kinetic power source 100 that generates power from the movement of a body of water 105.

FIG. 1 depicts hydro-kinetic power source 100 that generates power from the movement of a body of water 105. Power source 100 includes elongate members 110 each of a member length and extending vertically from an anchor point 115 toward the surface 120 of water body 105. Members 110 are equipped with generators 125 that are activated by tidal flow, waves, and surge current 130 as members 110 move about like kelp. Generators 125 convert kinetic energy to electrical energy. A relay platform 135 relays electrical energy to wherever it is needed via a conduit within a trunk system 140 along the bottom 145 of water body 105. Power source 100 can have multiple members 110 each exploiting movement near the respective position. Power source 100 can thus exploit complex eddy currents and changing current and surge directions. Relay platform 135 combines power from generators 125 for transmission.

In this embodiment, elongate members 110 are relatively rigid with generators 125 positioned at joints where they resist articulation to generate electrical power. Relay platform 135 includes an anchor (not shown in FIG. 1) that secures power source 100 to the aquatic floor. The bottom-most member 110, and thus the entire flexible system of elongate members 110, can be connected to relay platform 135 via a pivotal connection. Generators 125 can be external to members 110, or all or part of each generator can be enveloped within the members. Members 110 and generators 125 are collectively buoyant, and various types of floating elements can be added to facilitate buoyancy. Members 110, tubes in this example, can have other cross-sectional shapes, or can have a blend of different shapes. In one embodiment, for example, member 110 proximal relay platform 135 are cylindrical, while distal members 110 are e.g. flat or cruciform in cross section to increase resistance to flow. Some embodiments include a mix of flexible and inflexible members. Some embodiments include piezoelectric generators that produce an electric charge in response to mechanical stresses imposed between or within members 110.

Figure 2:
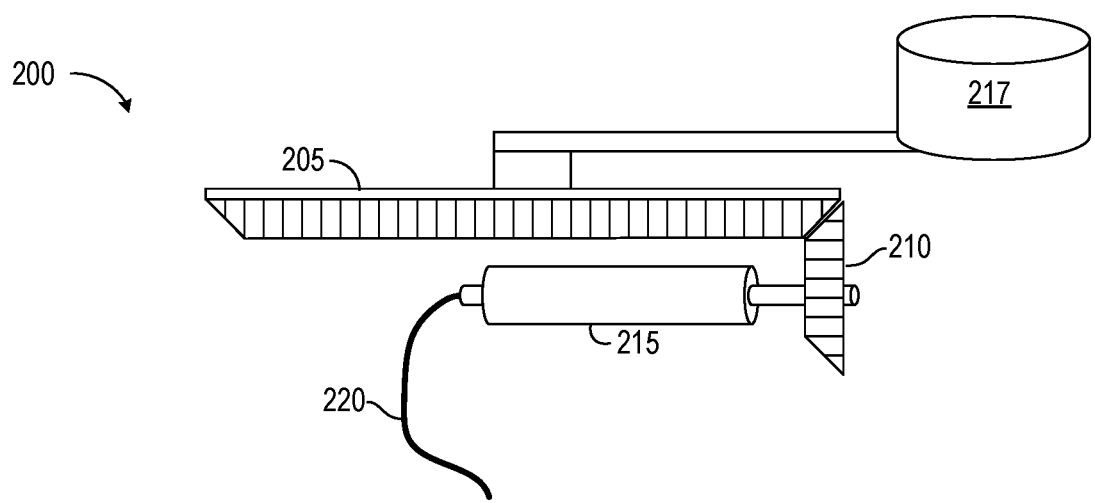
FIG. 2 depicts a generator 200 that can be used for generators 125 in one embodiment.

FIG. 2 depicts a generator 200 that can be used for generators 125 in one embodiment. Orthogonal gears 205 and 210 cause pivotal motion along a vertical axis to rotate the shaft of an electric generator 215. A weight 217 responds to movement by inducing circular motion of gear 205, which in turn rotates gear 210 and coaxial magnetic coil assembly 215. Electrical energy produced by this action is conveyed to relay platform 135 via a cable 220.

Figure 3:
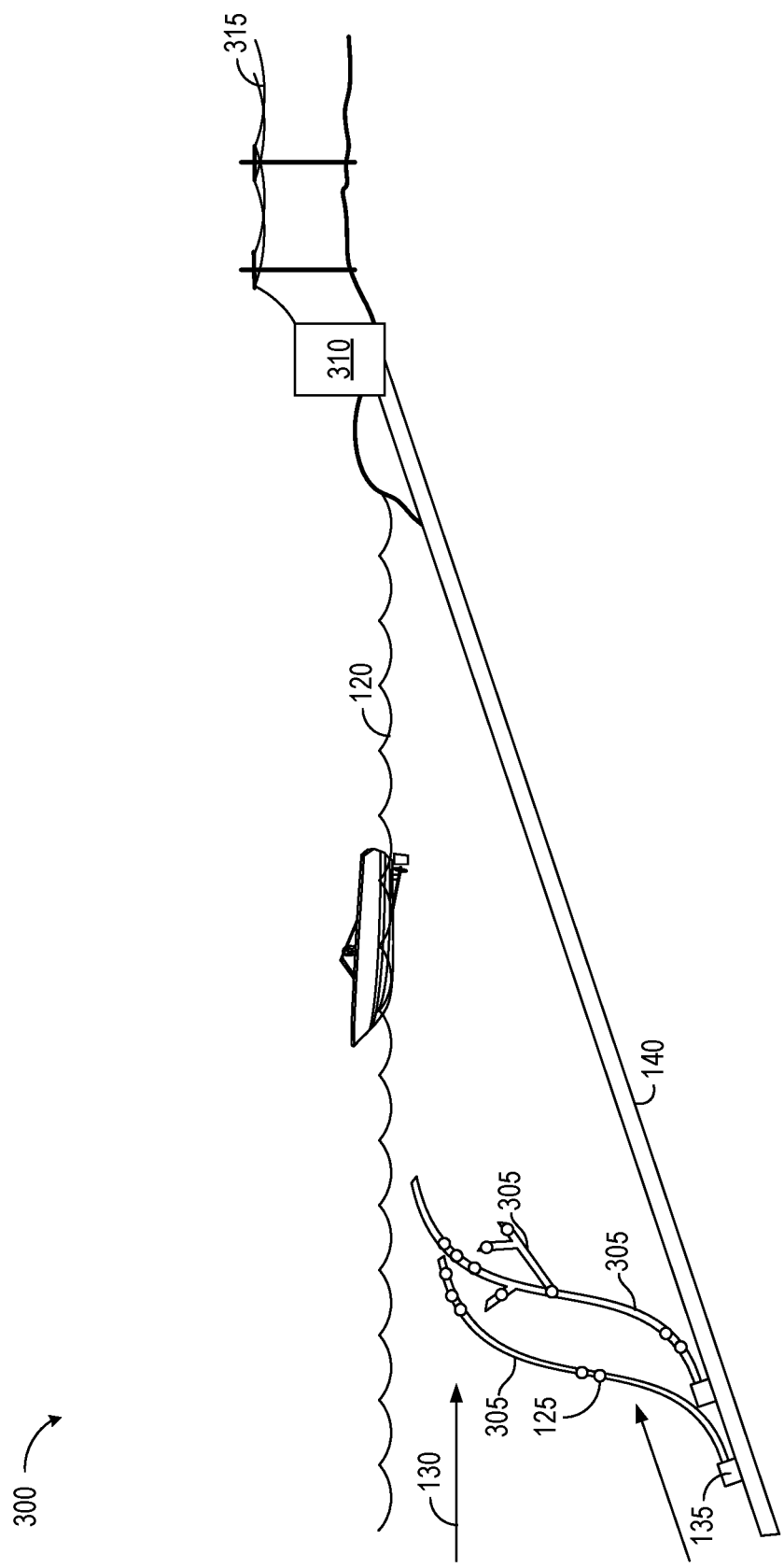
FIG. 3 depicts a hydro-kinetic power source 300 in accordance with another embodiment.

FIG. 3 depicts a hydro-kinetic power source 300 in accordance with another embodiment. Flexible elongate members 305 of e.g. circular cross section include energy-harvesting yarns of e.g. carbon nanotubes (CNTs) that stretch or twist with movement of the elongate members. The energy-harvesting yarns of CNT are coated or immersed within an ionically conducting material, an electrolyte (not shown). A voltage develops across the yarn when stretched or twisted in the electrolyte. This voltage inspires current flow and the resultant power is conveyed to an attached relay platform 135. A trunk system 140 conveys power from one or more relay platform 135 to a relay station 310, which conditions and conveys that power to the grid, represented here as power lines 315.

Members 305 can branch in the manner of e.g. kelp, and some of member 305 can be replaced with ridged members. may include ridged members and generators of the type detailed in connection with FIG. 1. Hydro-kinetic power sources of the type disclosed herein enhance aquatic habitat and protect aquatic life, particularly when groups of three or more flexible elongate members are collocated within e.g. 24 inches. Such collections create artificial kelp beds that offer shelter to species of aquatic life.

Trunk section 140 holds each elongate member at or within proximity to the bottom. An optimum depth for the trunk system may be within 10 meters of the water surface, or as identified per location, to optimize the cost of the system and forces originating from the body of water, ease of maintenance, and the cost and efficiency of power transfer. The highest points of power source 300 can be spaced from surface 120 to prevent interference with e.g. ships and bathers.

Relay platforms 135 may include one or more cables encased in an environmentally protective layer or coating and may be submerged or above ground. Relay platforms 135 conduct the energy pulled from each current generator to optimize the transmission of power through the system. They connect into a form of circuit or switch at the base of each elongate member. Similarly, multiple generator bodies optimize the transmission of energy by mapping into a separate system of circuits and switches. This system, relay platform, connects into the power transmission module. The relay platform connects via wired or wireless connections into the power transmission module, which then connects into either a power grid or energy storage facility.

Power transmission module 310 may connect to one or more short-distance or long-distance power lines, connecting to a public or private energy backbone or grid for widespread access to the power generated. Similarly, power may be collected in an energy storage facility, such as a system of accumulators or batteries, whether by coil, layer, or other. All materials with contact to water and the outside environment can be encased in polymers and metals formed of non-corroding materials, with a protective coating.

Figure 4:
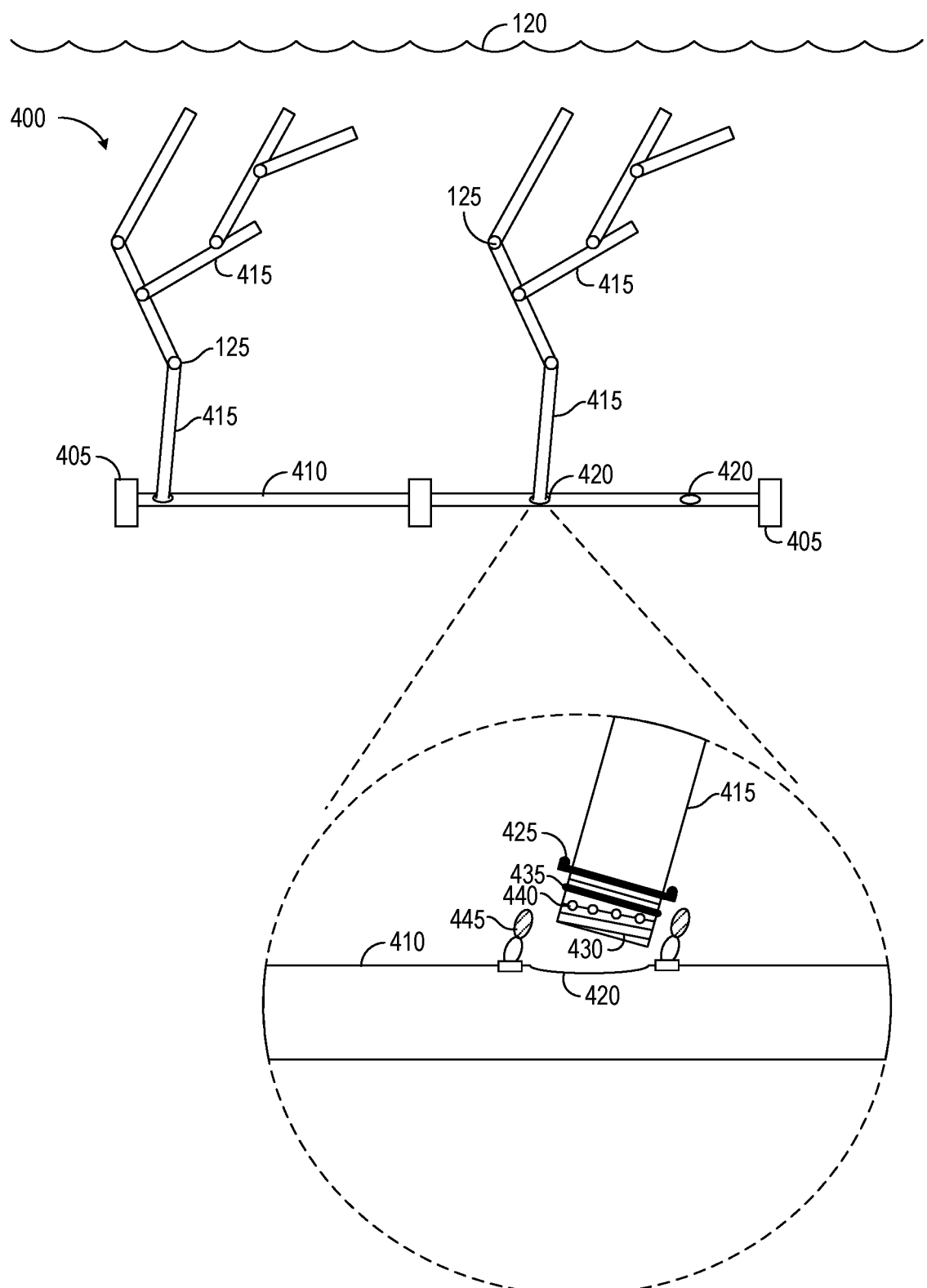
FIG. 4 shows a cross-sectional view of an aquatic body equipped with a hydro-kinetic power source 400.

FIG. 4 shows a cross-sectional view of an aquatic body equipped with a hydro-kinetic power source 400. In this view, aquatic forces, such as river and ocean current or waves would be flowing into the page, with a river bank off the page to the left and right, or going into (or away) from shore in a lake, sea, or ocean, etc. Anchors 405 or other adhering system secures a trunk system 410 on or near the aquatic body floor. There are a multitude of mechanisms to secure such anchor or adhering system. Elongate members 415 are attached to trunk system 410 via pre-configured connectors 420, which can be included for ease of assembly, maintenance, or extensibility.

FIG. 4 includes an expanded view of one embodiment of a connector 420 and corresponding end of an elongate member 415. To allow for ease of installation and removal, connector 420 may be done in water with pressures consistent to the depths for placement of the trunk and base of an elongate body. A water- and air-tight seal 425 along the base of an elongate member, allowing a firm seal to the trunk, also helps align the corresponding elongate member with its wiring connection(s) and those in the trunk. Threads 430 and O-ring 435 support a twist-and-lock second seal. The end of the elongate member 415 may hold a contour (such as concave were trunk to be oval or round, or precut to a special shape cutout commensurate with the circumference of elongate member 415) allowing it to fit into trunk 410. When a person or machine attaches the elongate member to the trunk, the base of the elongate member touches one or more (two shown) seals in the trunk. With contact of the elongate member to the trunk, water gets forced away from the one or more seals, out from the base, with water not pushed away between the seals and the bottom of the elongate member flowing out through one or more small holes 440. Once the elongate member connects into the trunk, it may be further locked into place by e.g. tabs 445 that set and lock into seal 425 A tab or tabs 445 secure each elongate member 415 to trunk 410 and further ensure proper member orientation, which can be important for proper wire connections.

A means for conveying the power generated from each generator 125 runs the length of each elongate member 415 and connects into trunk 410. With one embodiment, the means of conveying the power run continuously through each elongate member and trunk, but the optional embodiment shown FIG. 4 is modular, with one or more tabs ensuring proper alignment of this means of conveying the power seamlessly from each elongate member through the trunk, while also providing an additional means of attachment between the elongate member and the trunk.

Figure 5A:
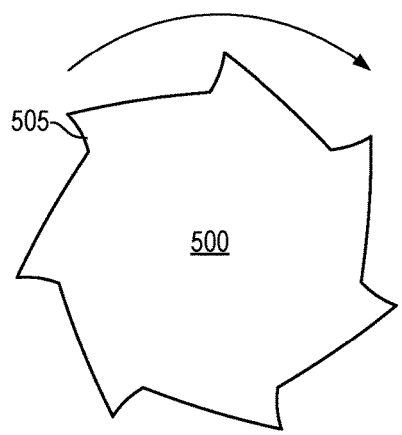
FIG. 5A is a cross section of a spherical turbine blade 500 for omnidirectionally extracting hydrodynamic kinetic energy.

FIG. 5A is a cross section of a spherical turbine blade 500 for omnidirectionally extracting hydrodynamic kinetic energy. Asymmetrical blade elements 505 cause blade 500 to rotate on its axis responsive to flow in any direction parallel with the plane of the page.

Figure 5B:
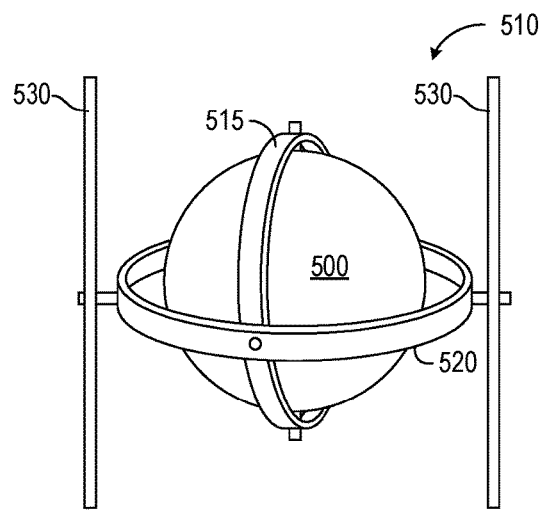
FIG. 5B depicts a gimballed power source 510 that allows turbine blade 500 of FIG. 5A to rotate along two axes supported by a pair of rings 515 and 520 pivoted at right angles.

FIG. 5B depicts a gimballed power source 510 that allows turbine blade 500 of FIG. 5A to rotate along two axes supported by a pair of rings 515 and 520 pivoted at right angles. Though not shown, power source 510 includes a generator that turns with blade 500 and conductors that send power so generated through one or both of a pair of supporting members 530.

Figure 5C:
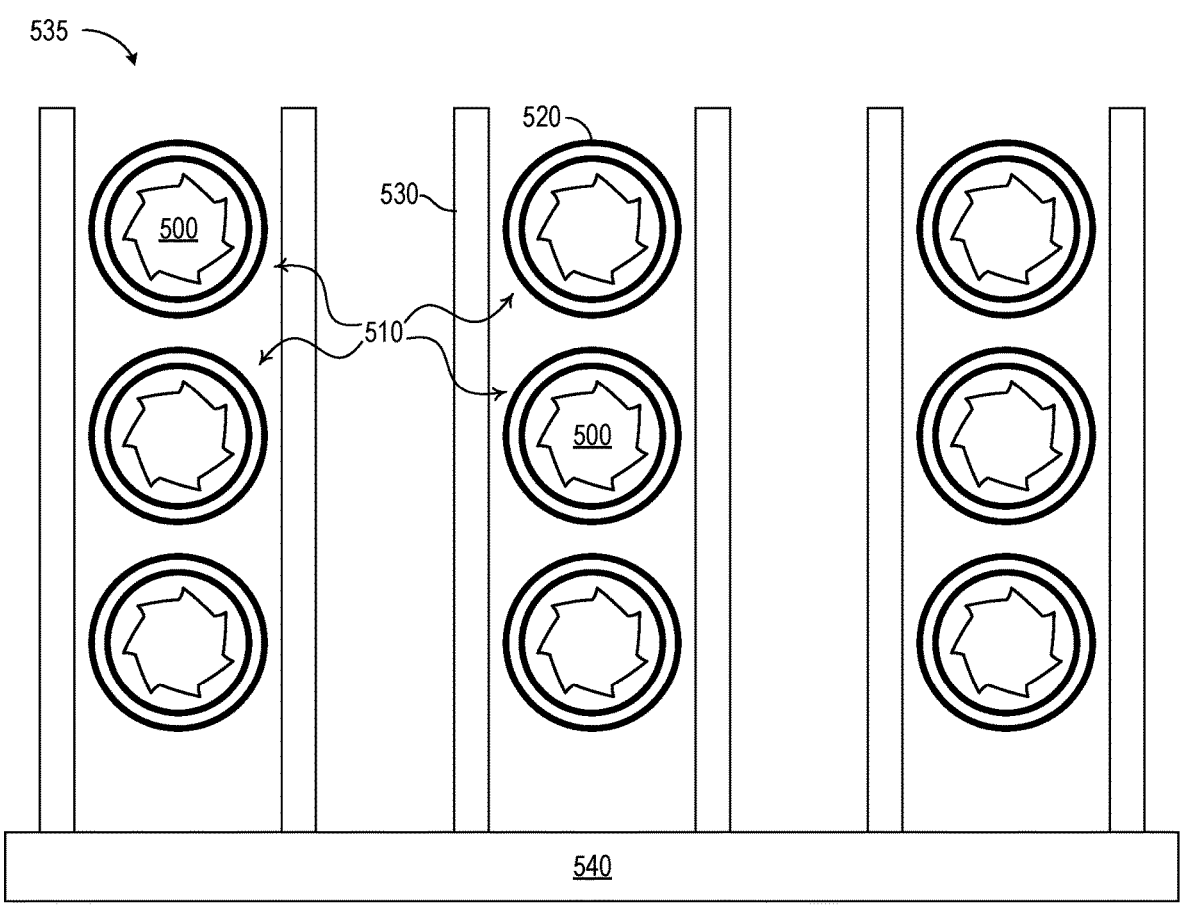
FIG. 5C depicts a hydro-kinetic power source 535 incorporating columns of gimballed power sources 510 of FIG. 5B all connected physically and electrically to a trunk system 540.

FIG. 5C depicts a hydro-kinetic power source 535 incorporating columns of gimballed power sources 510 of FIG. 5B all connected physically and electrically to a trunk system 540. Supporting members 530 are rigid. Blades 500 turn responsive to flow through power source 535 in any direction and can thus capture energy from complex, unpredictable flow patterns.

While the subject matter has been described in connection with specific embodiments, other embodiments are also envisioned. For example, generators noted previously can generate and transmit AC or DC power, pressurized gas, or hydraulic fluid. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A hydro-kinetic power source to generate power from movement of a body of water, the hydro-kinetic power source comprising:
   a flexible system of elongate members, each elongate member having a member length extending vertically from an anchor point toward a surface of the body of water;
   a plurality of generators affixed to the elongate members and placed vertically along the system of elongate members between the anchor point and the surface, the generators to generate power responsive to flexing of the system of elongate members;
   a relay platform coupled to the generators to combine the power from the generators and transmit the combined power;
   a trunk system attached to system of elongate members; and
   a second flexible system of second elongate members, each second elongate member having:
      a second member length extending vertically toward the surface of the body of water; and
      a second generator affixed to the second elongate member and electrically coupled to the trunk system, the second generator to generate power responsive to flexing of the second flexible system of elongate members.

2. The power source of claim 1, the system of elongate members comprising joints, each of the generators resisting articulation of at least one of the joints.

3. The power source of claim 1, wherein the power from the generators is electrical power.

4. The power source of claim 1, further comprising an anchor anchoring the system of elongate members to an aquatic floor beneath the body of water.

5. The power source of claim 4, further comprising a pivot between the system of elongate members and the anchor.

6. The power source of claim 1, wherein the system of elongate members envelopes the generators.

7. The power source of claim 1, wherein the system of elongate members is buoyant.

8. The power source of claim 1, where the system of elongate members is fully submerged in the body of water.

9. The power source of claim 1, where the system of elongate members has an asymmetrical cross section between the generators.

10. The power source of claim 1, the system of elongate members including a disconnect mechanism to the anchor point.

11. The power source of claim 10, wherein the disconnect member comprises a twist seal.

12. The power source of claim 1, further comprising an anchor coupled to the anchor point to affix the system of elongate members to an aquatic floor.

13. The power source of claim 1, that supports additional trunk systems.

\* \* \* \* \*